United States Patent
Knowles (10) Patent No.: US 10,722,823 B2
(45) Date of Patent: Jul. 28, 2020

(54) VENTED BAFFLE FOR CLARIFIER TANK

(71) Applicant: NEFCO Systems, Inc., Palm Beach Gardens, FL (US)

(72) Inventor: Thaddeus J. Knowles, Stuart, FL (US)

(73) Assignee: NEFCO Systems, Inc., Palm Beach Gardens, FL (US)

( * ) Notice: Subject to any disclaimer, the term of this patent is extended or adjusted under 35 U.S.C. 154(b) by 0 days.

(21) Appl. No.: 16/058,060

(22) Filed: Aug. 8, 2018

(65) Prior Publication Data
US 2020/0047087 A1 Feb. 13, 2020

(51) Int. Cl.
*B01D 21/02* (2006.01)
*B01D 21/00* (2006.01)
*B01D 21/24* (2006.01)

(52) U.S. Cl.
CPC ..... *B01D 21/0042* (2013.01); *B01D 21/0075* (2013.01); *B01D 21/2494* (2013.01)

(58) Field of Classification Search
CPC ............ B01D 21/0042; B01D 21/0075; B01D 21/2494
USPC ...................................... 210/521, 532.1, 539
See application file for complete search history.

(56) References Cited

U.S. PATENT DOCUMENTS

| | | | |
|---|---|---|---|
| 4,109,433 A | | 8/1978 | Maze |
| 4,391,704 A * | | 7/1983 | Anderson ......... B01D 21/0003 210/539 |
| 4,767,536 A * | | 8/1988 | Roley .................... B01D 21/10 210/539 |
| 5,252,205 A * | | 10/1993 | Schaller ............ B01D 21/0042 210/521 |
| 5,286,392 A | | 2/1994 | Shea |
| 5,597,483 A * | | 1/1997 | Schaller ............ B01D 21/2494 210/539 |
| 7,416,662 B2 * | | 8/2008 | Aditham ........... B01D 21/0042 210/539 |
| 7,722,776 B2 * | | 5/2010 | Essemiani ......... B01D 21/0042 210/521 |
| 7,971,731 B2 * | | 7/2011 | Schaller ............ B01D 21/0042 210/521 |
| 2008/0185334 A1 * | | 8/2008 | Schaller ............ B01D 21/0042 210/521 |
| 2008/0230463 A1 * | | 9/2008 | Schaller ............ B01D 21/0042 210/532.1 |
| 2010/0193423 A1 * | | 8/2010 | Schaller ............ B01D 21/0042 210/521 |
| 2012/0248036 A1 * | | 10/2012 | Schaller ............ B01D 21/0042 210/521 |
| 2017/0252673 A1 * | | 9/2017 | Heimdal ............ B01D 21/0042 |

* cited by examiner

*Primary Examiner* — Christopher Upton
(74) *Attorney, Agent, or Firm* — Sofer & Haroun, LLP (57) ABSTRACT

A vented baffle system is formed of a plurality of individual panel members, for use in a clarifier tank. The vented baffle system includes a plurality of inter-engaged individual panel members with each baffle having a unitarily integrated design. The panel members each may have one or more relief conduits directed to the center of the tank away from the vertical side wall.

9 Claims, 11 Drawing Sheets

TOP VIEW
(Not to Scale)

VENTED BAFFLE FOR CLARIFIER TANK

FIELD OF THE INVENTION

This invention relates generally to a vented baffle and vented baffle system for use in a solids-precipitating clarifier tank, the baffle system having a plurality of inter-engaged individual vented baffles secured to the clarifier tank peripheral wall.

BACKGROUND OF THE INVENTION

The present invention relates generally to a baffle in a clarifier tank for gravitationally separating solids suspended in a liquid contained in the tank. These baffle devices are also known in the art as a lamella gravity separator or settler. The clarifiers with which the inventive baffle device is used typically have a circular or rectangularly-configured tank in which a centrally mounted, radially-extended arm is slowly moved or rotated about the tank at or proximate to the surface of the carrier liquid. For a more detailed description of such vented (and non-vented) baffle systems, U.S. Pat. Nos. 5,252,205 and 5,597,483 to Schaller are referred to and hereby incorporated by reference.

Figure 1:
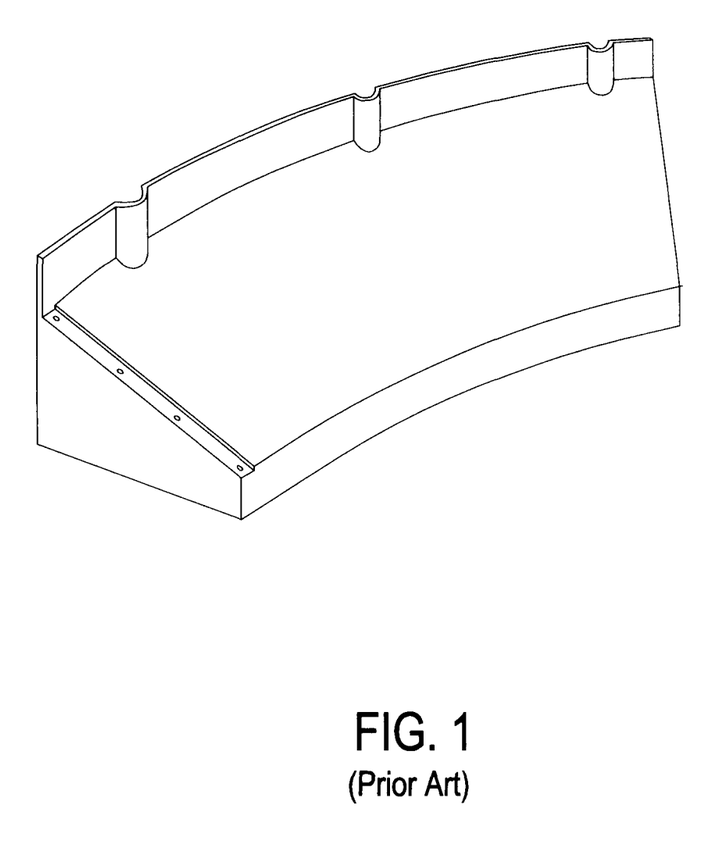
FIG. 1 is prior art image of a vertically vented baffle.
Figure 2:
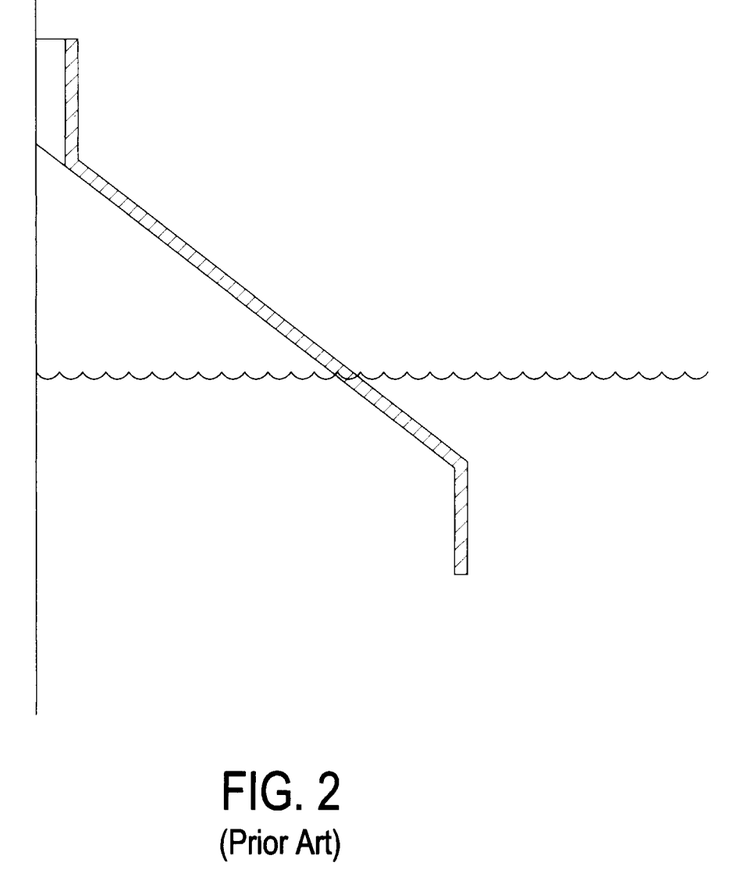
FIG. 2 is a side view of the prior art vertically vented baffle of FIG. 1.

Typical prior art vented baffles such as that shown in FIG. 1, that are mounted in cantilevered fashion along a peripheral wall of the clarifier intermediate with respect to the tank bottom and the surface of the carrier liquid contained in the tank. The vented baffle system includes a plurality of such baffles which are constructed as modular units and form a continuous, single-surface sheet that slopes downwardly from the peripheral tank wall toward the center of the tank and terminates at a free edge suspended spaced apart and above the tank bottom. More specifically, each panel member which is downwardly sloping from the peripheral tank wall toward the interior of the tank and the tank bottom, is provided with a lower side and an upper side. The panel member extends downwardly from an upper edge secured to the peripheral tank wall to a lower edge disposed in a spaced relation to the tank bottom. The panel member has a first lateral side and a second lateral side with the panel member defining a space formed between the junction of the lower side of the panel member and the peripheral tank wall.

Due to the inclined configuration of these baffles, air may be trapped during the filling of the tank in a space formed between the junction of the lower side of the panel member and the peripheral tank wall. Other gases that may form naturally as a part of the process which takes place within the clarifier, may also be trapped in this space. Accordingly, the forces imposed by these gases on the baffle require that the baffle be constructed and mounted in such a manner that will withstand these forces. As well, the build-up of pressure from these gases can be extreme with damage to the baffle unit or clarifier resulting unless some form of venting is provided.

A common form of prior art venting (not shown) relies on one or more holes drilled in the baffle panel member to continually vent the gas to the surface and alleviate the build-up of pressure. Small holes (1 inch diameter or less) however rapidly become clogged with sludge and become ineffective. Larger holes allow the continual up-flow of waste solids and can create a negative impact on the performance of the baffle.

Numerous clarifier and baffle configurations are disclosed in the art. However, prior art attempts have suffered from a variety of various drawbacks and deficiencies.

For example, U.S. Pat. No. 4,109,433 to Maze relates to a ventilator for spaces under slanted roofs or attics such as a gable, hip and shed roof types. Specifically, the ventilator uses an elongate duct positioned between the adjacent rafters under a roof. However, there is no disclosure in the reference of an improved vented baffle system which is constructed as a modular unit and that consists of a plurality of inter-engaged individual baffles, each formed as a unitarily-integrated element incorporating the panel member, a vent means and an integral end bracket for suspended securement of the baffle to the peripheral wall of the clarifier tank.

U.S. Pat. No. 5,286,392 to Shea is directed to a launder and baffle structure used in association with a filtration tank of which the type using granular filtration media is disclosed. Specifically, a regulable air discharge system is disclosed to release a selected amount of air from beneath the baffle system in order to regulate turbulence and thereby facilitate quiescence of flow. This reference, however, does not teach an improved vented baffle system having a plurality of baffles with each baffle consisting of unitarily-integrated design incorporating a panel member, an end bracket for cantilevered securement of the baffle to the peripheral wall and a relief valve means which is in fluid communication with the space formed between the junction of the lower side of the panel member and the peripheral tank wall preventing the pressure in said space.

Another prior art arrangement provides for vented baffles extending in an upward fashion projecting upwards as shown in FIG. 1 taken from U.S. Pat. No. 5,597,483. In such wastewater treatment facilities utilizing secondary clarifiers, the clarifier's effectiveness in removing solids is one of the most important factors in establishing the final effluent quality of the facility. A major deterrent to effective removal is the presence of sludge density currents that cause hydraulic short circuits within the tank. These short circuits, in turn, allow solids concentrations to unintentionally bypass the tank's clarification volume and enter the effluent.

In prior art upwardly vented baffles such as the one shown in FIG. 1, the vent is typically a hole or half-round vertical duct of various size drilled or molded into the top of the inclined surface of the baffle. These vents release gases that accumulate underneath the baffle. The gases are a result of the decomposition of the solids within the dense sludge blanket below and the solids that float and gather up under the baffle panels. This occurrence is part of every clarifier due to the composition of the water that resides within them. The vents not only allow the gases to pass but they also allow water to flow through. The water will also have solids in it but typically not enough to impede on the performance of the baffle.

However, in the cases of where there is a heavy concentration of solids or higher water flow causing the water to be more concentrated, the water flow through the upwardly directed vent can diminish the performance of the baffle by increasing the Total Suspended Solids (TSS) concentration of the water going over the weir as the vents direct the solids and gas directly up along the outer wall of the tank towards the weir and spill channel.

Objects and Summary

It is, therefore, an object of the present invention to provide a system of integrated vented baffles, curved to match the peripheral contour of a circular or arcuate tank or, alternatively, linear to match the peripheral walls of a non-circular tank, and which interlock to form a rigid "shelf" or baffle system inclined inward and downward around the entire periphery of the tank.

Another object of the invention is to provide a relief conduit passage in fluid communication with the space formed between the junction of the lower side of the panel member and the peripheral tank wall preventing the pressure in the space and which is integrally molded into the panel member.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

In accordance with the invention, a vented baffle system is formed of a plurality of individual panel members, for use in a clarifier tank. The vented baffle system includes a plurality of inter-engaged individual panel members with each baffle having a unitarily integrated design. The panel members each may have one or more relief conduits directed to the center of the tank away from the vertical side wall.

In this way the inventive vented baffle system, which is mounted in cantilevered fashion along the peripheral wall of the clarifier intermediate to the bottom of the tank and the surface of the contained liquid in the tank, forms a continuous single-surface sheet or "shelf" that slopes downwardly from the peripheral tank wall toward the center of the tank and terminates at a free edge suspended in spaced relation above the tank bottom.

The panel member can be further provided with a supplemental mounting flange along the top or upper edge of the member. The supplemental mounting flange may be unitarily formed along the upper edge of the panel member to thereby provide additional support and securement of the panel member to the peripheral wall of the clarifier tank.

The panel member may also or alternatively be provided with a unitarily-integral rigidizing flange depending from and extending along the lower edge of the panel member for providing additional structural strength thereto, particularly along the rigidizing flange, which serves as a stiffening member for the lower, only indirectly supported portion of the panel member. The rigidizing flange also contributes to deflection of density currents and redirection of liquid flow back into the central volume of the tank.

Referring to the venting structure, a relief conduit is provided near the top of each baffle panel. The relief conduit may be rounded (e.g. semi-circular) or rectangular in shape. For example, the conduit is a hole or slot cut into the baffle panel.

The venting conduits or passages are not upwardly flowing as in the prior art but rather are directed inwardly, preferably perpendicular to the outer tank wall. These vents provide continuous venting of the pressure in the space formed between the junction of the lower side of the panel member and the peripheral tank wall thereby alleviating the build up of pressure.

In one embodiment, the individual vented baffles are fabricated from a molded reinforced fiberglass composite as one-piece, unitarily-integrated units. Thus, each molded baffle incorporates the panel member, the end bracket, the optional mounting flange and optional stiffeners in a single unit that, advantageously, enables significant reductions both in manufacturing time and for installation as compared to other, prior art arrangements and systems.

As well, the unitarily integrated units may incorporate the vent means as described above. Preferably, the thickness of the fiberglass panels is in the range of from about 3/16th to 1/4th of an inch, a range that provides substantial structural strength and rigidity while remaining sufficiently light-weight for unusual ease of installation.

The invention accordingly describes the features and method of construction, the combination of elements and the arrangements of parts which will be exemplified in the embodiments hereinafter set forth, the scope of the invention being indicated by the appended claims.

BRIEF DESCRIPTION OF THE DRAWINGS

In the drawings, wherein like reference numerals denotes similar elements throughout the several views.

DETAILED DESCRIPTION

Figure 3:
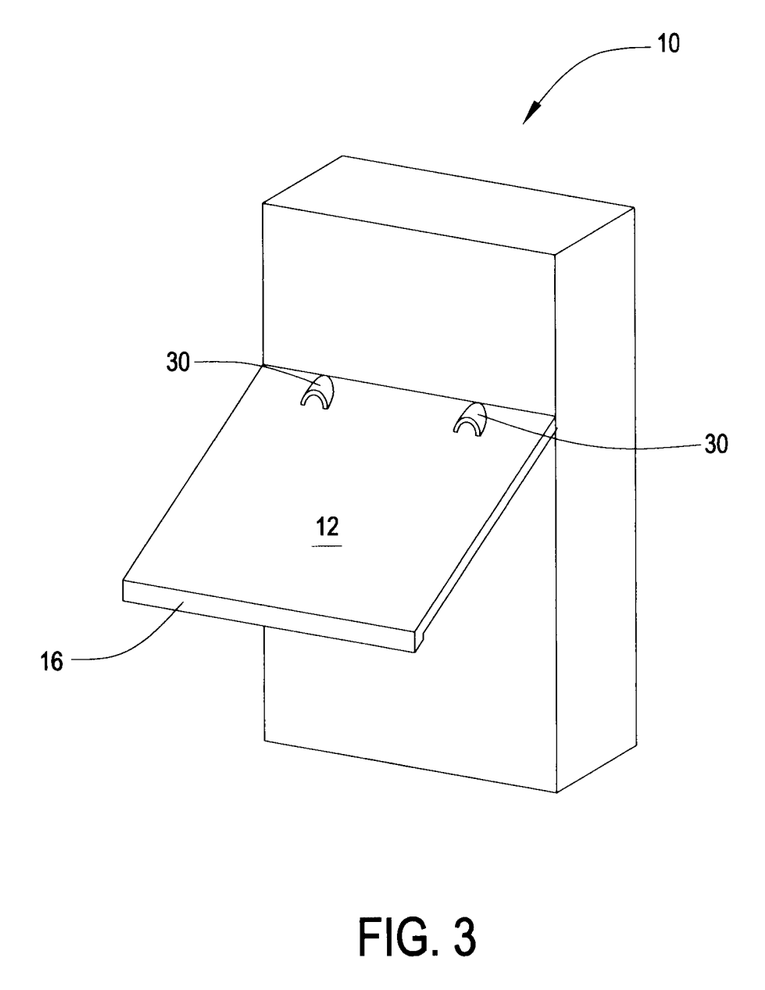
FIG. 3 is perspective view of a vented baffle according to one embodiment.
Figure 4:
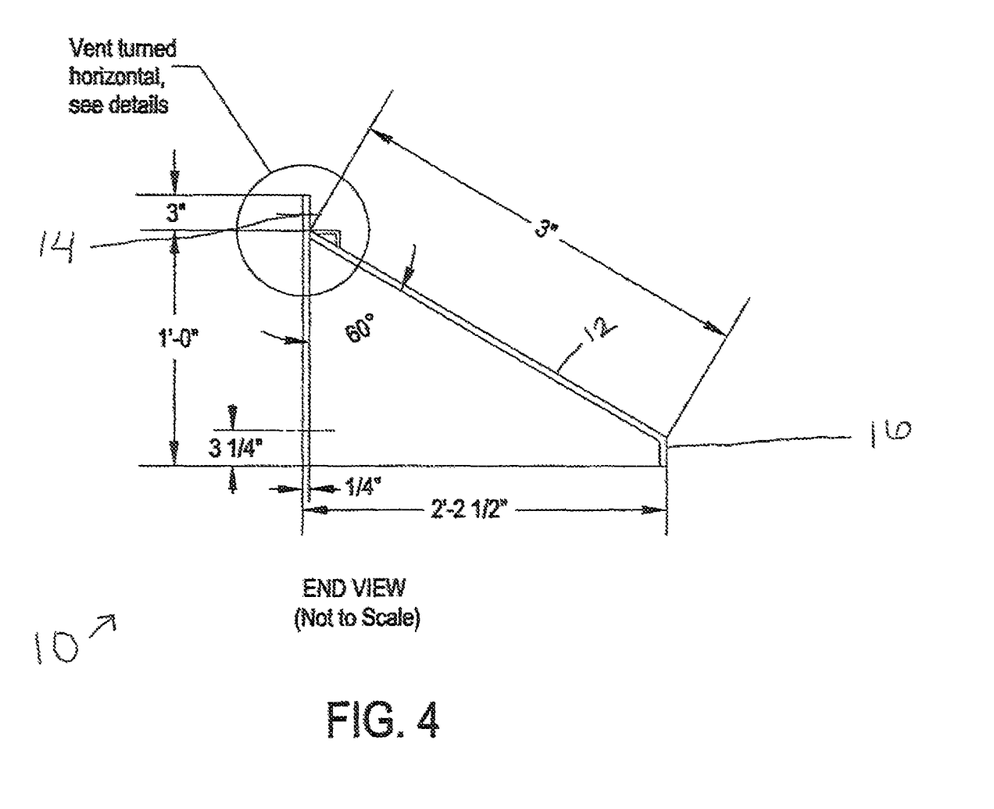
FIG. 4 is a side view of the vented baffle of FIG. 3.
Figure 5:
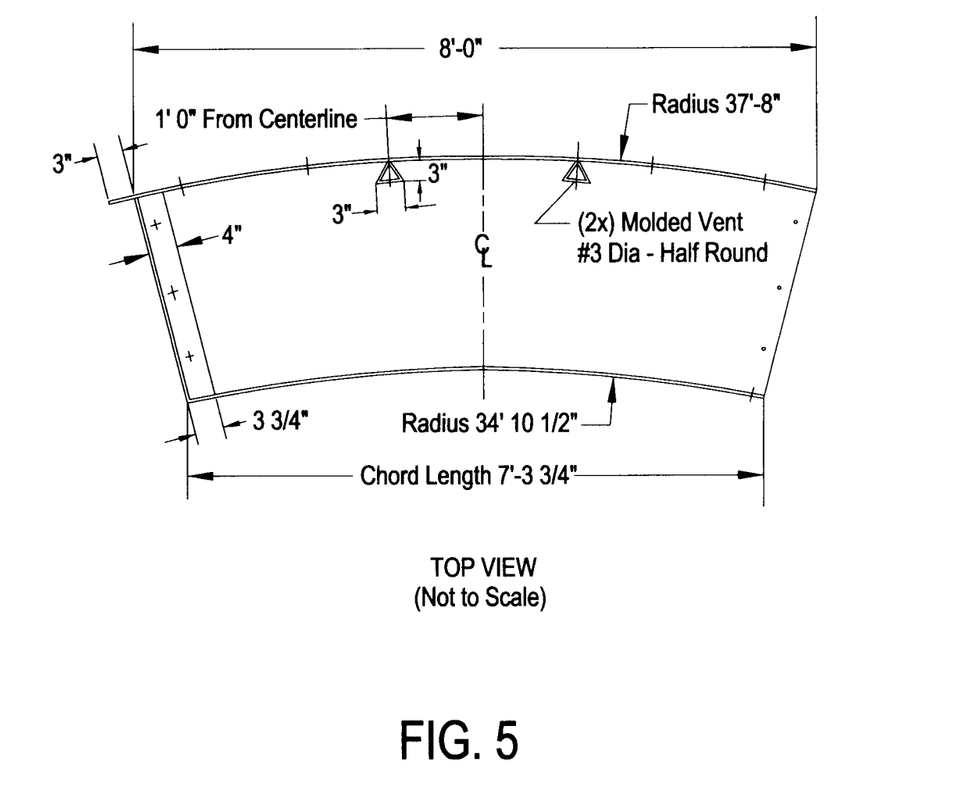
FIG. 5 is a top view of the vented baffle of FIG. 3.

As shown in FIGS. 3 and 4, The present arrangement as claimed in claim 1 is directed to a baffle 10 that includes a smoothly planar, downwardly sloping surface 12 and having an end bracket 14 unitarily fabricated at the top of the baffle 10 for securing it to the radially inward facing surface of the peripheral wall 20 of a clarifier tank (e.g. 50 ft or 100 ft radius tank). Such baffles 10 may be attached in succession around the entire inner circumference of the clarifier tank in an interconnected manner. In one embodiment, baffles 10 may further have downward stiffening flange 16 that assists in keeping solid flow in the launder tank towards the center of the tank. FIG. 5 shows a top view of baffle 10 and vents 30. Each baffle 10 is curved to match the curve of tank wall 20.

As noted above, wastewater clarifier tanks, particularly circular tanks receive influent with solids from the bottom center of the tank. The effluent, with lowered solid concentrations exits over the upper edge of tank wall 20 into a launder channel, possibly through baffles and weir devices. The baffle(s) 10 help keep the flow of solids contained in the influent re-directed towards the center of the tank instead of upwards towards the effluent launder channel.

Figure 6:
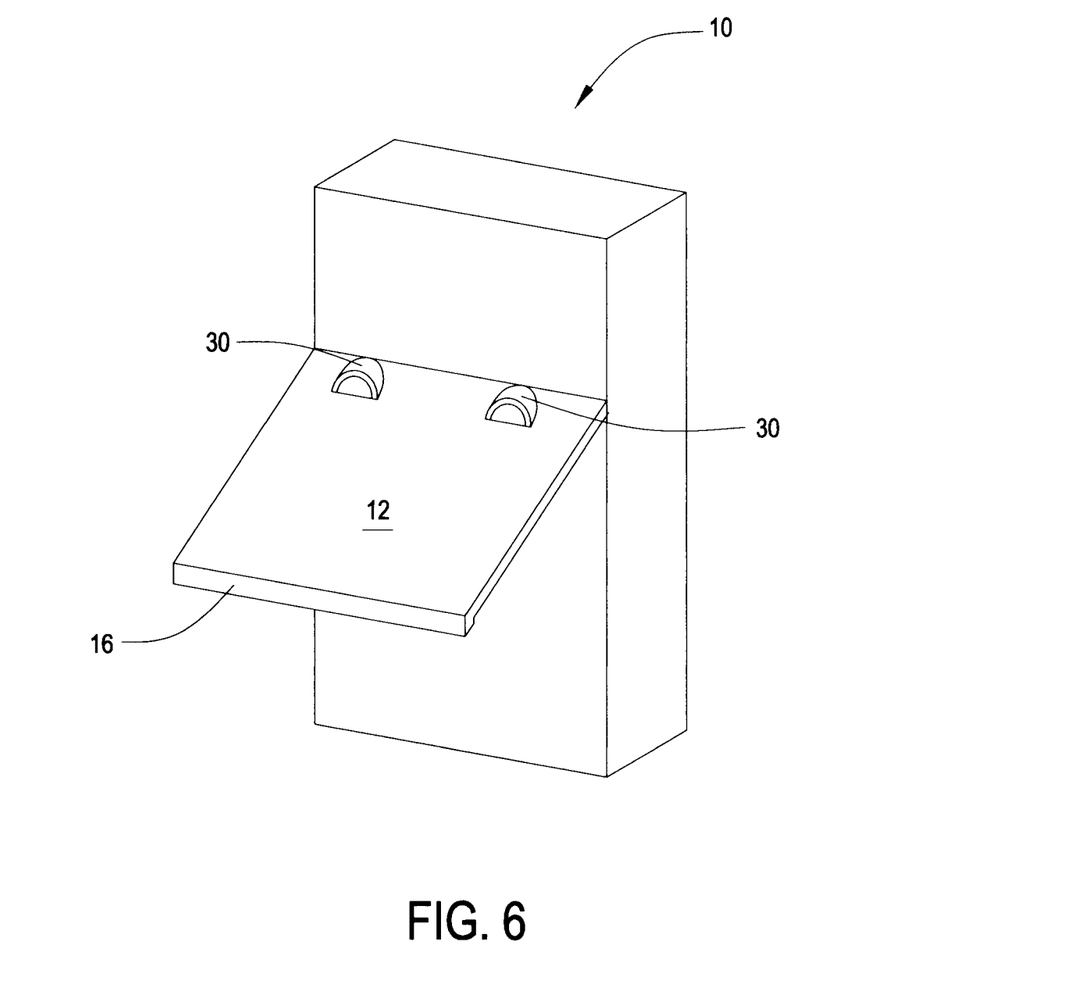
FIG. 6 is a perspective view of a vented baffle with a larger vent opening according to one embodiment.
Figure 7:
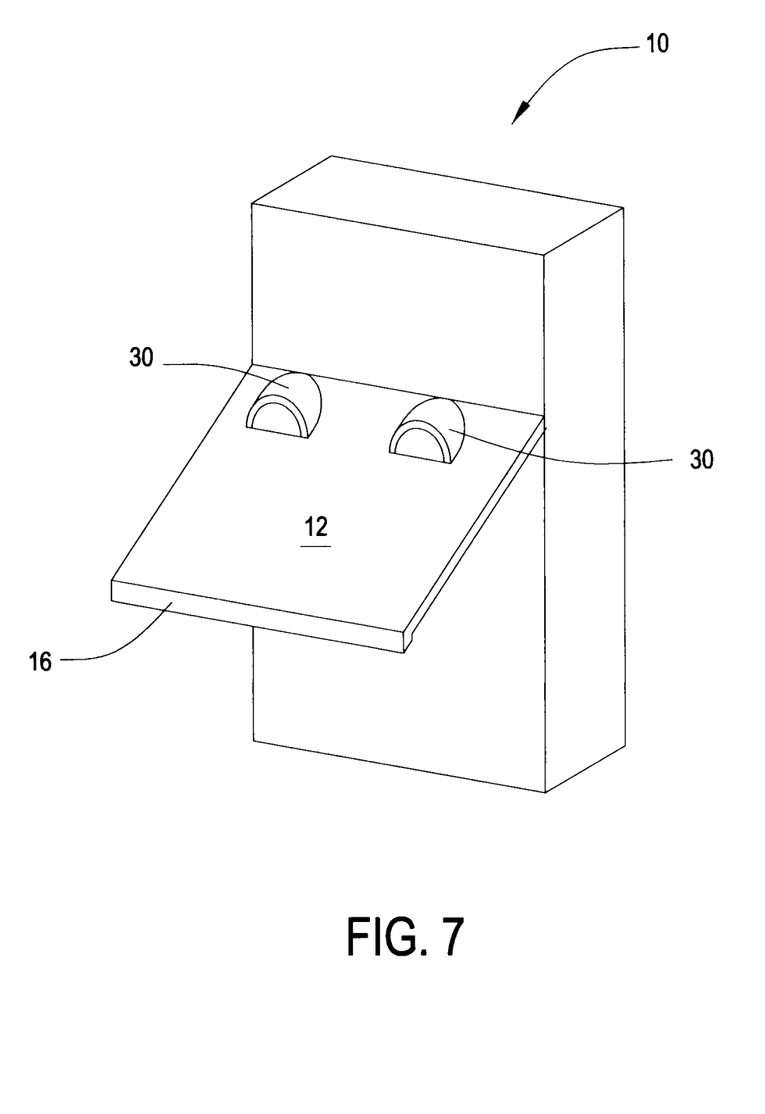
FIG. 7 is a perspective view of a vented baffle with a larger vent opening according to one embodiment.

As shown in FIGS. 3 and 4, the baffle 10 also includes one or more vents 30 provided near the top of each baffle 10. In the illustrated version in FIG. 1, vents 30 are in the form of semi-circular vents but it is understood that other shapes are available. The preferred embodiment of baffle 10 has two vents 30 per baffle 10. As discussed in the summary above, vents 30 prevent the excessive trapping of solids under the baffles (10) which would otherwise reduce or eliminate their effectiveness FIG. 6 illustrates another embodiment of baffle 10 with vents 30 of a larger dimension. FIG. 7 likewise illustrates another embodiment of baffle 10 with vents 30 of a larger dimension. In non-limiting examples, the horizontal vents 30 are semi-circular having radii of 1½", 3" and 4" respectively. In some testing of vents 30 of 1½" and 3" created an improved jet flow than the 4" vents 30 but in all instances the flow solid waste is substantially diverted away from the effluent weir wall. It is understood that the sizing of vents 30 may be of some relevance for tank designs to address certain specific conditions for the tank in which they are installed but in no way are the sizes intended to limit the scope of the present invention.

Applicants note that the size of vents 30 and the number of vents 30 per baffle 10 in this application are exemplary. Other sizes, shapes and numbers of vents are within the contemplation of the present invention.

As described in more detail below when vents 30 are turned perpendicular to the peripheral wall of the tank as shown in FIGS. 3, 6 and 7, the water flow through them gets re-directed towards the center of the tank so, in turn, any solids present in the flow are also re-directed away from the effluent weir wall which promotes redirection of TSS (Total Suspended Solids), keeping the effluent water more clean or free of TSS going over the weir relative to vertically directed vent arrangements of the prior art.

Figure 8:
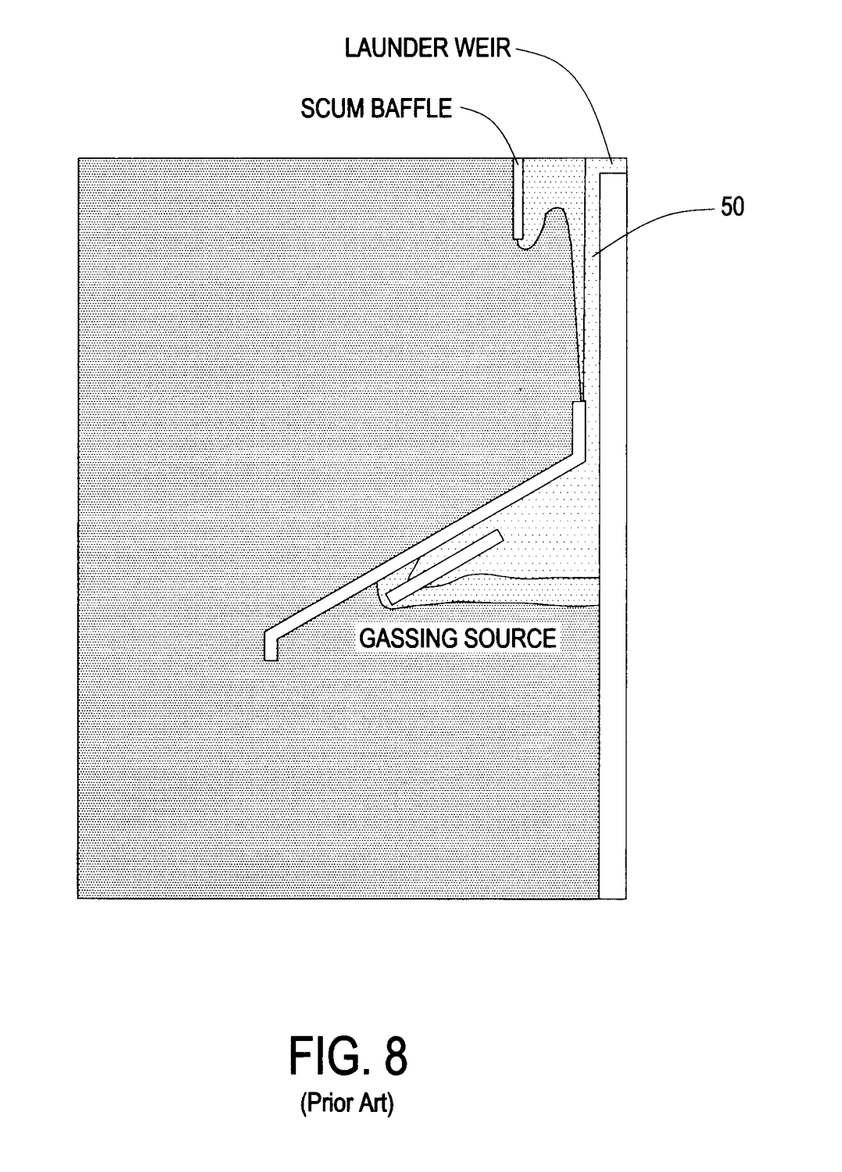
FIG. 8 is a simulation image of a vertically vented prior art baffle showing a vertically vented gas.

FIG. 8 shows a prior art configuration in which the vents are aimed vertically/upwards or parallel to the peripheral wall. This causes the water flow and TSS through the vents to travel in more direct path towards the effluent, thus increasing the presence of TSS therein. In cases of excessive flow or TSS concentration, this causes the effluent to be less clean going over the weir possibly creating a "short circuiting" effect.

Figure 9:
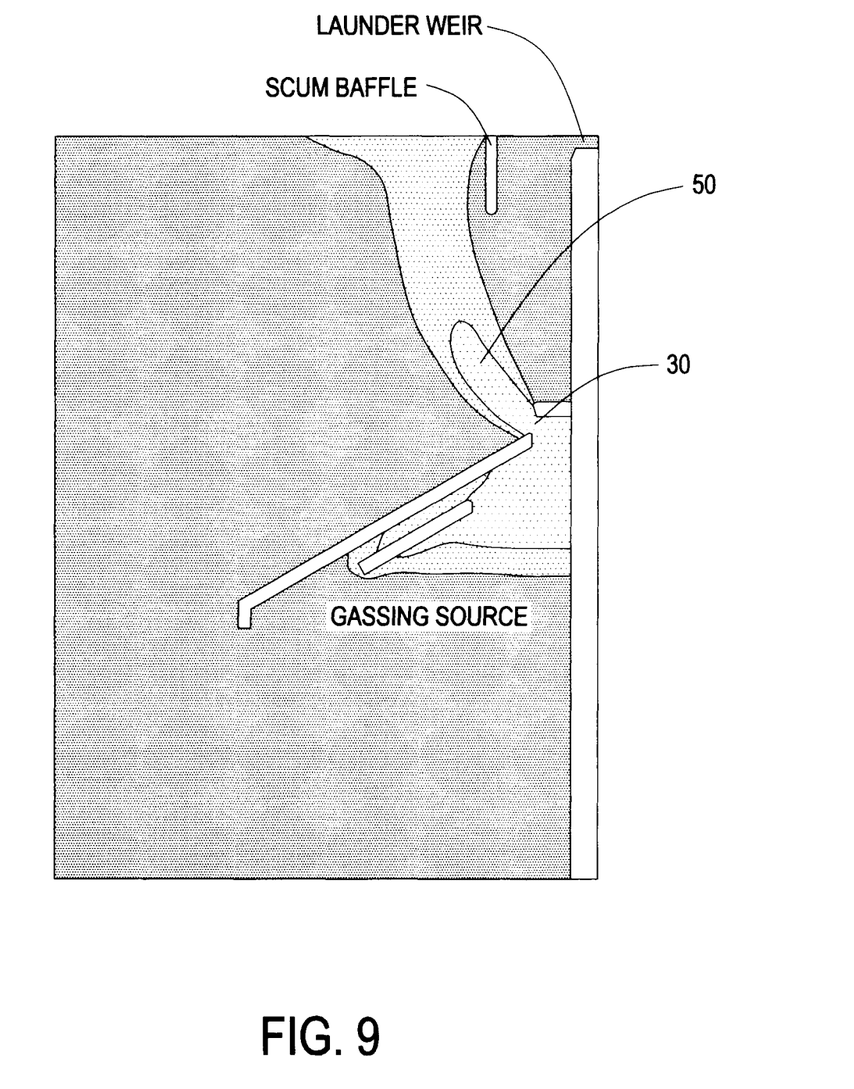
FIG. 9 is a simulation image of a horizontally vented baffle of FIG. 3, showing a horizontally projected vented gas, in accordance with one embodiment.
Figure 10:
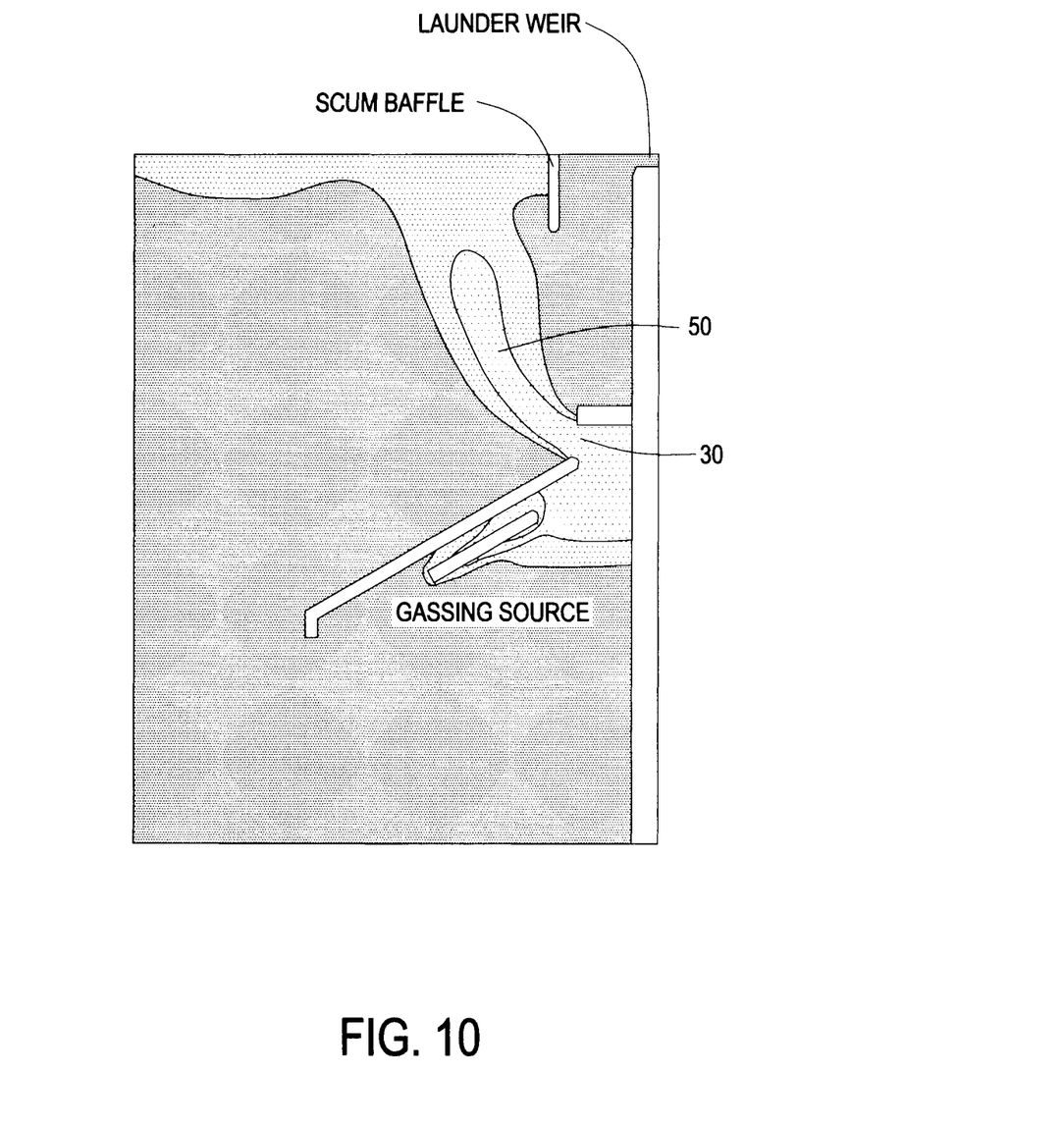
FIG. 10 is a simulation image of a horizontally vented baffle of FIG. 6, showing a horizontally projected vented gas, in accordance with one embodiment.
Figure 11:
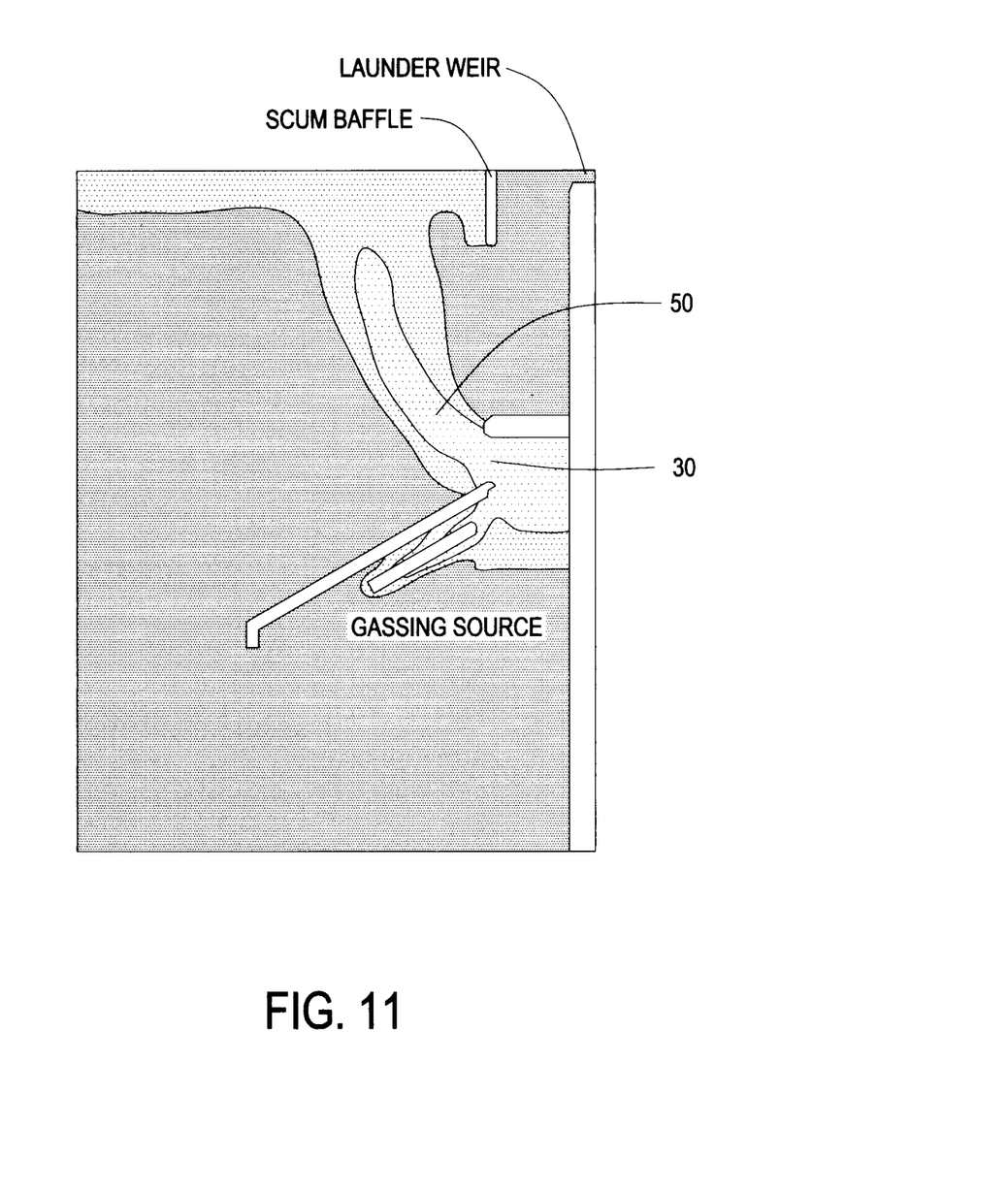
FIG. 11 is a simulation image of a horizontally vented baffle of FIG. 7, showing a horizontally projected vented gas, in accordance with one embodiment.

Based on FIGS. 3, 6 & 7, correlated cut away views FIGS. 9, 10 and 11 respectively show the simulation of water flow and TSS through vents 30. Each simulation used an approximated flow rate of 0.127 cfs (cubic feet per second) which is a typical tank flow rate found in clarifier tanks of a wastewater treatment plant. The line immediately below the profile of the baffle is there to represent the source of the gasses that can accumulate. A plume of gasses 50 that is generated by the solid, highlights the flow pattern created when the flow rate is introduced.

FIG. 9 relates to 1½" radial vents 30 pointed horizontal, perpendicular to the peripheral tank wall. FIG. 10 relates to 3" radial vents 30 pointed horizontal, perpendicular to the peripheral tank wall. FIG. 11 relates to 4½" radial vents 30 pointed horizontal, perpendicular to the peripheral tank wall.

As shown in FIGS. 9-11 the flow pattern/plume 50 in each instance shows clearly that whichever size vent 30 is used, the gasses are redirected away from the peripheral wall and towards the center of the tank. This being know, solids present in the flow will follow the same pattern in turn enhancing the performance of the baffle by reducing the TSS of the effluent water going over the launder weir wall.

It should be understood that the preferred embodiments and examples described are for illustrative purposes only and are not to be construed as limiting the scope of the present invention which is properly delineated only in the appended claims.

What is claimed is:

1. A baffle in a clarifier tank for gravitationally separating solids suspended in a liquid contained in the tank, the clarifier tank having a tank bottom and a substantially vertical peripheral wall bounding the liquid contained in the tank, said baffle comprising:
a panel member downwardly sloping from the peripheral tank wall toward the interior of the tank and the tank bottom, said panel member having a lower side and an upper side, said panel member extending downwardly from an upper edge to a lower edge disposed in a spaced relation to the tank bottom said panel member having a first lateral side and a second lateral side, said panel member defining a space formed between the junction of the lower side of the panel member and the peripheral tank wall; and
at least one relief vent molded into said panel member and in fluid communication with said space formed between the panel member and the peripheral tank wall for venting the pressure in said space, said relief vent having a first inlet end and a second outlet end, wherein said relief vent, directed towards the center of said clarifier tank, includes a curved upper opening surface perpendicular to the vertical peripheral wall of the tank.

2. The baffle system of claim 1, wherein the peripheral wall of the clarifier tank has a radius of curvature, and wherein said panel member upper edge has a radius of curvature which corresponds to the radius of curvature of the clarifier tank.

3. The baffle system of claim 1, each of said baffles further comprising a rigidizing flange unitarily depending from said lower edge of said panel member for providing enhanced rigidity to said panel member.

4. The baffle system of claim 1, wherein an end bracket further comprises a mounting flange securable to the peripheral tank wall in surface-to-surface engagement for securing said end bracket to the peripheral wall, and a mounting surface for receiving the first lateral side of the panel member of a next-adjacent one of said plural baffles so as to secure together adjacent ones of said baffles in end-to-end relation.

5. The baffle system of claim 4, wherein said panel member defines a smoothly continuous plane and said mounting surface of said end bracket is recessed from said plane so that when the first lateral side of a panel member of one of said plural baffles is secured to said end bracket of a next-adjacent one of said plural baffles, the panel members of said one and next-adjacent baffles together form a smoothly-continuous downwardly, sloping surface.

6. The baffle system of claim 1, wherein said baffle is molded as a one-piece unit of a reinforced fiberglass composite.

7. The baffle of claim 1, wherein the curved upper opening surface perpendicular to the vertical peripheral wall of the tank has a radius of 1½ inches.

8. The baffle of claim 1, wherein the curved upper opening surface perpendicular to the vertical peripheral wall of the tank has a radius of 3 inches.

9. The baffle of claim 1, wherein the curved upper opening surface perpendicular to the vertical peripheral wall of the tank has a radius of 4 inches.

* * * * *